United States Patent [19]

Salice

[11] Patent Number: 5,613,796
[45] Date of Patent: Mar. 25, 1997

[54] ATTACHMENT ELEMENT

[75] Inventor: Luciano Salice, Carimate, Italy

[73] Assignee: Arturo Salice S.P.A., Novedrate, Italy

[21] Appl. No.: 636,469

[22] Filed: Apr. 19, 1996

[30] Foreign Application Priority Data

Apr. 19, 1995 [DE] Germany .................. 295 06 600.8
Jul. 11, 1995 [DE] Germany .................. 295 11 216.6

[51] Int. Cl.⁶ ......................................... F16B 2/14
[52] U.S. Cl. ............................. 403/409.1; 403/405.1; 403/407.1; 292/34
[58] Field of Search .................. 292/34, 139, 140, 292/336.3; 403/405.1, 407.1, 409.1

[56] References Cited

U.S. PATENT DOCUMENTS

| | | | |
|---|---|---|---|
| 1,908,980 | 5/1933 | Heyel | 292/34 |
| 2,519,464 | 8/1950 | Haseltine | 403/405.1 |
| 3,347,574 | 10/1967 | Sturbin | 403/407.1 |
| 3,545,799 | 12/1970 | Gertsfeld | 292/34 |
| 4,060,949 | 12/1977 | Busse | 52/285 |
| 4,127,353 | 11/1978 | Busse | 403/245 |
| 4,693,630 | 9/1987 | Giovannetti | 403/405.1 |
| 4,752,150 | 6/1988 | Salice | 403/330 |
| 4,826,345 | 5/1989 | Salice | 403/231 |
| 4,898,482 | 12/1990 | Stewart | 384/626 |
| 5,540,515 | 7/1996 | Rock et al. | 403/407.1 |

FOREIGN PATENT DOCUMENTS 2919769 11/1980 Germany .................. 403/405

*Primary Examiner*—Steven N. Meyers
*Assistant Examiner*—Donald J. Lecher
*Attorney, Agent, or Firm*—Morgan & Finnegan, L.L.P.

[57] ABSTRACT

The invention relates to an attachment element for fitting parts, comprising a pin-like and substantially cylindrical section (10), which is provided with a radial aperture (13), in which two expanding bodies (17 and 18) are able to be extended in opposite directions past the cylindrical enveloping contour and in this part are guided for retraction, and a link (27) or slide (90), whose one end is acted upon by an actuating lever for moving same and whose other end is secured to a bolt running in axial slots (14 and 15) in the cylindrical section (10), such bolt extending through slots (24 and 25) in the expanding bodies (17 and 18) in such a manner that same are moved outward and inward by pivotal movement of the link or lever.

25 Claims, 10 Drawing Sheets

ATTACHMENT ELEMENT

BRIEF DESCRIPTION OF THE INVENTION

The invention relates to an attachment element for fitting parts.

BACKGROUND OF THE INVENTION

Furniture is generally delivered in separate parts or bought by the user as a set of prefabricated separate parts so that it may only be assembled in its final place of use and gotten into its condition ready for use. In this respect for the fitters and more particularly for the user, who is generally inexperienced as regards the assembly of furniture, it is desirable for the prefabricated furniture parts such that they may be simply and rapidly assembled and put together as furniture ready for use. A factor which particularly facilitates assembly is the ability to be put together simply and even assembled without the use of tools. It is consequently an objective of fitting manufacturers to supply the furniture industry with attachment elements, which render possible the assembly of prefabricated furniture parts without specialized tools. Thus for example the patent publications DE-C 2,837,327, DE-C 2,905,378 and EP-A 0 610 765 disclose furniture fittings, whose attachment elements may be mounted in suitable pre-drilled holes and may be locked therein by flipping over a lever, that is to say without using a tool.

SUMMARY OF THE INVENTION

One object of the present invention is to create an attachment element of the type initially mentioned which may be locked and securely seated in a pre-drilled hole simply by flipping over or pressing down a lever.

In accordance with the invention this aim is to be attained by an attachment element having the features of claim 1 herein.

The pin-like cylindrical section of the attachment element of the invention is inserted like an expanding wall plug in a suitable pre-drilled hole, it then being anchored in the hole by flipping over the lever so that the expanding bodies are moved outward and lockingly engage the walls of the hole.

The pin-like cylindrical section of the invention can be employed with fitting parts of all different types, which are to be secured in a pre-drilled hole in a component.

In accordance with a preferred development the attachment element of the invention serves for the attachment of a plate-like part, preferably in the form of a furniture fitting part, the essentially cylindrical section is connected with the plate-like part, a lever is pivotally connected with the plate-like part and a link is pivotally connected with one end of the lever at some distance from its pivot bearing, the other end of such link being attached to the bolt running in the axial slots in the cylindrical section.

The expanding bodies may take the form of rectangular guide members which at their extensible and retractable ends bear arcuately curved, toothed segments. It is convenient if the segments are provided with saw-tooth-like ribs for biting into the side wall surface of the hole. The flanks, facing the plate-like part, of the ribs may be made more oblique than the opposite flanks so that the expanding wall pin-like cylindrical section is drawn into the hole on pressing the ribs into the hole's wall surface.

The guide members may be designed so that their inner surfaces run on the link enclosed between them and their outer surfaces run on the side walls of the aperture.

An other preferred feature of the invention is such that the guide members are provided with terminal guide surfaces to run between the guide surfaces, which delimit the aperture and are present at the bottom and top of the cylindrical section, such guide surfaces being inclined upward for each expanding body in the extension direction, that is to say rising toward the plate-like part. This design means that due to the oppositely directed extension movement of the expanding bodies the cylindrical section is drawn into the pre-drilled hole. It is convenient if, as an adaptation to the guide surfaces of the aperture, the terminal surfaces of the guide members are made oblique as well to match the guide surfaces. In accordance with this design the guide members possess the outline of parallelograms.

For extension and retraction in opposite directions the guide members possess intersecting sections of the slots. In accordance with a preferred embodiment there is a provision such that the slots of the guide members are angular in form and possess an upper longer limb extending at a greater angle from the center plane and a shorter limb extending at a smaller angle from the center plane in the opposite direction. In this embodiment the expanding bodies are extended by pressing down the locking lever so that the bolt slides along the longer sections of the slots before it enters the shorter limbs thereof, in which it is arrested in the locking position due to the opposite angles. This means that the attachment element in accordance with the invention is secured against unintentional release.

In accordance with a further preferred development of the novel attachment element there is a provision such that at the upper sides thereof the guide members are provided with abutments for cooperation with complementary abutments of the top walls of the apertures so that by drawing the bolt in the slots past the enveloping contour of the cylindrical section the expanding bodies are pivoted outward and pulled into the same.

The attachment element of the invention may be employed for the assembly of all parts to be mounted in pre-drilled holes. However it is more particularly advantageous that the attachment element of the invention may be employed to secure furniture fittings in place. For fitting a hinge on a door or flap two attachment elements can be secured to the edge, extended in the form of a flange, of a hinge anchoring pot or of the attachment plate of a hinge arm. In this case the lever preferably comprises a plate, which in its inwardly pivoted locking position covers over the edge, widened out in the form of a flange, of the hinge anchoring pot or the wing, serving for attachment, of the attachment plate. In this design in the fitted condition the locking lever is kept concealed, since it covers over the attachment flange or a wing serving for attachment and accordingly endows the fitting with a pleasing appearance, when it is secured in place.

The invention furthermore contemplates an arrangement in which the pin-like cylindrical section is connected with a fitting to be attached to the furniture part and is able to be inserted into a hole of suitable diameter in a furniture part. Preferably the cylindrical section constitutes a radial extension of a pot-like housing. In this respect the slide, which bears the bolt for extending the expanding bodies, can be provided with an integral actuating part, on which the actuating lever acts. Preferably the actuating part of the slide runs in a radially sliding fashion in lateral grooves in the side walls of the recess of the housing, the slide, connected with the same, fitting through an aperture in the circumferential wall of the housing into the pin-like cylindrical extension.

An other feature of the invention is such that the actuating lever is designed in the form of two-armed lever and has its pivot pin rotatably mounted in holes in the side walls of the recess, the shorter arm of the lever fitting into an aperture in the actuating part, whereas the longer arm rests on the top side of the housing. In this case the longer arm of the lever is able to be pivoted out of its upwardly projecting released setting of the attachment element into its locking setting, in which it is generally in the same plane as the cover plate of the housing. It is in this manner that it is possible to ensure that in the locked setting the longer lever arm, serving for actuation, can not be unintentionally unlocked when objects strike it and right it.

The actuating part may be provided with a rectangular aperture, the short lever arm fitting into it generally possessing the form of an equilateral triangle with rounded apices, whose point is adjacent to the pivot axis. In this design the angles and the radius of curvature of the apices are so matched to one another that on pivoting of the lever the front and rear sides of the generally triangular shorter lever rest against the front and rear edges of the rectangular aperture in the actuating part.

In accordance with a further development of the invention there is a provision such that the housing is divided in its axial center plane, extending through the cylindrical section, and comprises two parts symmetrically extending toward one another. In their parting plane the two housing parts can be provided with pins and complementary recesses so that they may be fitted together in a simple fashion, after insertion of the slide and of the lever, to give the complete or closed housing. Preferably the housing parts are in the form of injection molded plastic parts.

An other preferred feature of the invention is such that the pin-like cylindrical section constitutes the prolongation of an insert housing, wherein the slide and the actuating lever are pivotally mounted, the insert housing is secured in a longitudinally sliding manner in the pot-like housing and furthermore the pivot pins of the actuating lever are pivotally arranged in holes in the side walls of the insert housing and are provided with eccentric extension pins, which are pivotally mounted in holes in the walls of the recess in the housing. In the case of this preferred form on pivoting of the actuating lever out of its upright unlocked position into the locked position there is not only a spreading out of the expanding bodies by the bolt; furthermore the insert housing performs a radial draw-in movement in the housing additionally so that because of this any play present between parts to be connected together may be taken up. The insert housing as well can be divided in its axial center plane and may consist of injection molded plastic parts.

Embodiments of the invention will now be described with reference to the drawings in more detail.

BRIEF DESCRIPTION OF THE DRAWING

FIG. 1 shows a conventional furniture hinge, whose arm 1 provided with attachment means is articulatingly connected by two links 3 and 4 to the hinge anchoring pot 2. The hinge arm 1 may be snap-fitted on an attachment plate 5 without using any tools, such plate 5 being secured to a side wall 6 of the body part of a piece of furniture. The releasable detent connection between the hinge arm 1 and the attachment plate 5 is of known type and therefore not described here in detail.

Figure 1:
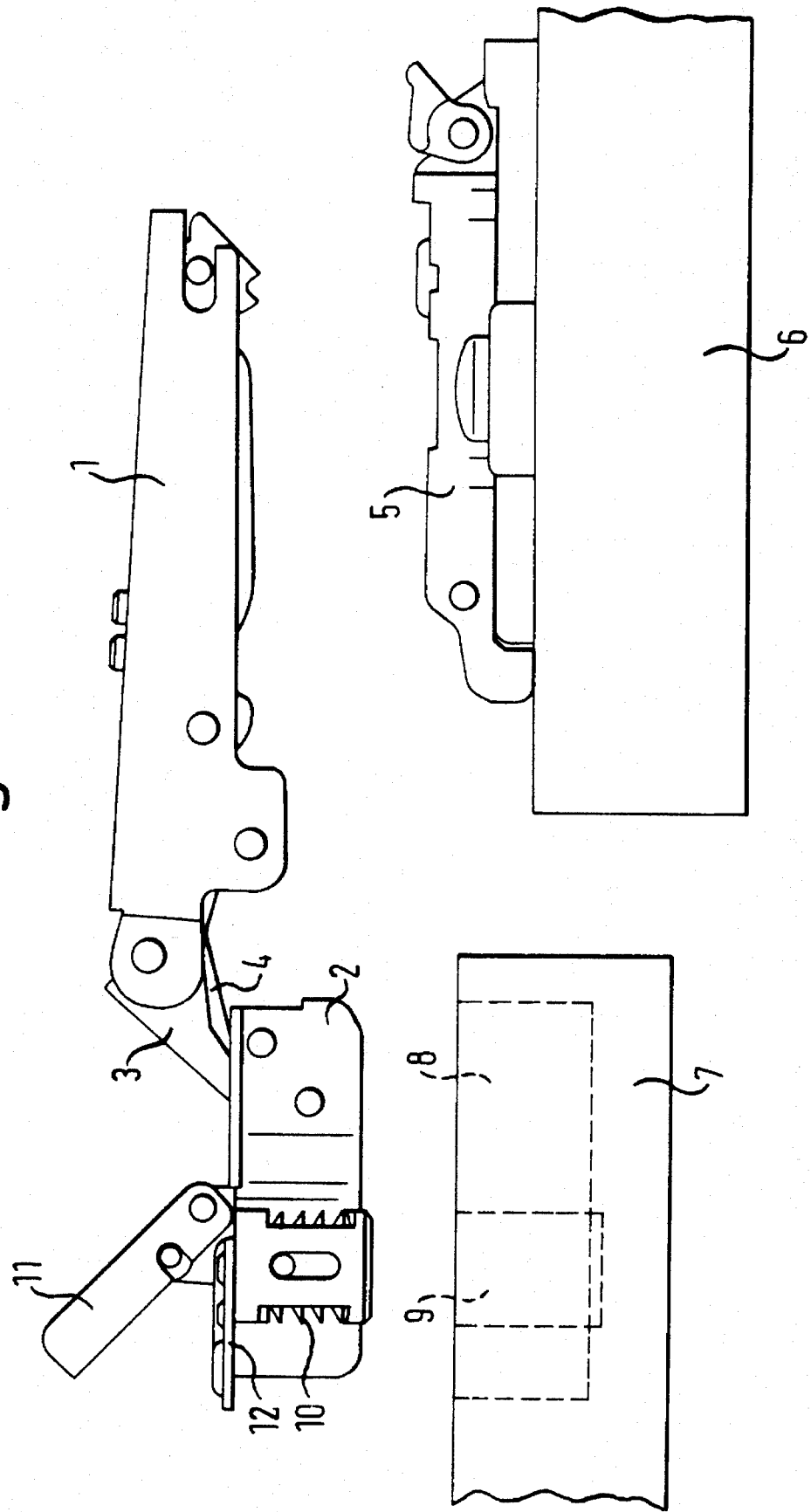
FIG. 1 shows a hinge provided with attachment elements in accordance with the invention in the position for assembly.

The hinge anchoring pot 2 as well may be secured to a door 7 of a furniture part without using tools, i.e. only by manipulation by hand. The furniture door 7 is provided in a conventional fashion with a shallow blind hole 8 to receive the hinge anchoring pot 2 and, to the side of the hole, with two pre-drilled holes 9 for expanding wall plugs. In the pre-drilled blind holes 9 the two expanding wall plug-like cylindrical sections 10 are inserted, which are connected with the flange-like edges 12 of the hinge anchoring pot 2. The expanding wall plug-like cylindrical sections 10 are locked in the pre-drilled holes 9 simply by pressing down a plate 11 forming an actuating lever.

Figure 10:
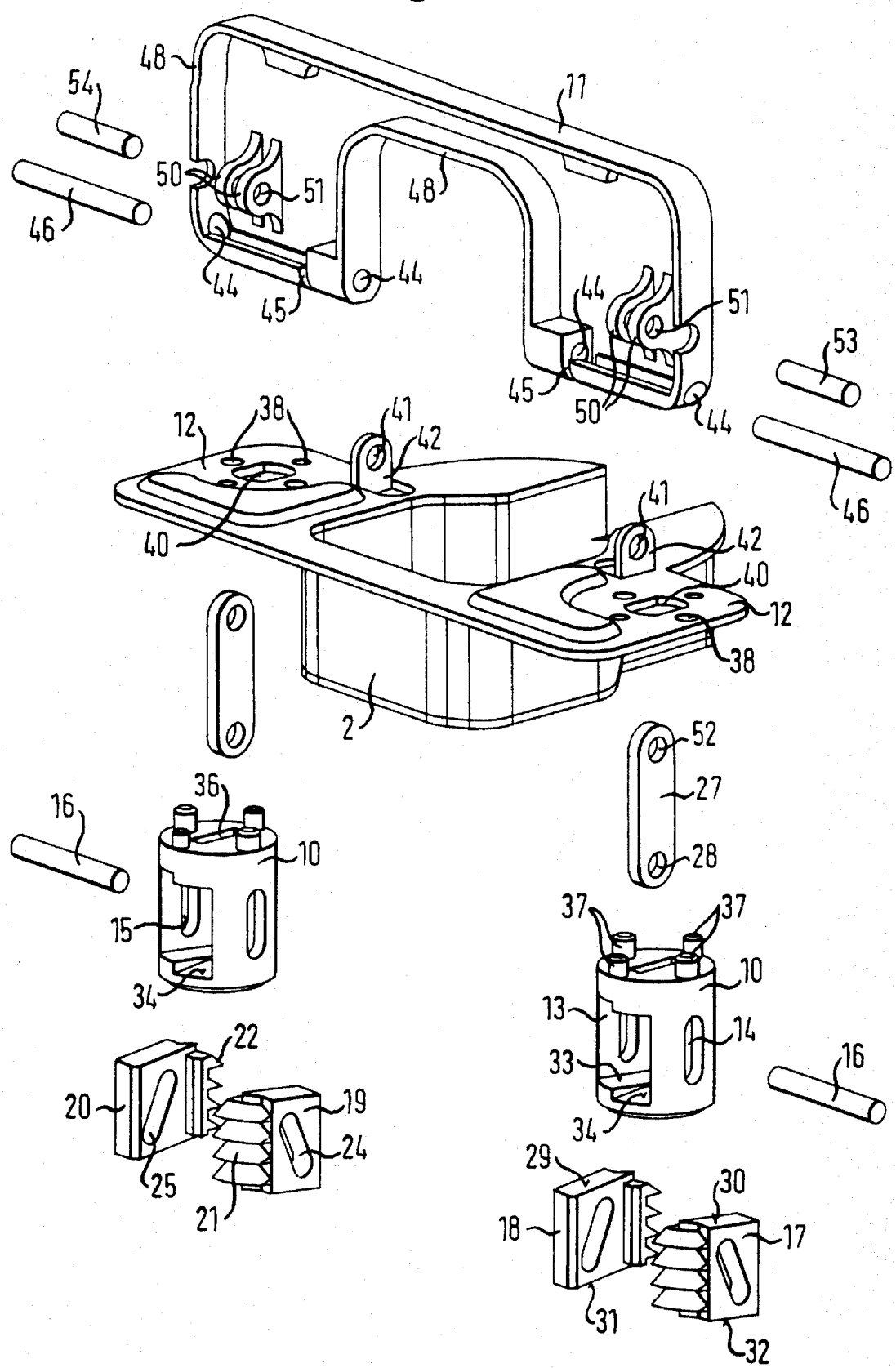
FIG. 10 shows a hinge anchoring pot with the attachment elements of the invention in accordance with FIGS. 1 through 8 in an exploded view.
Figure 11:
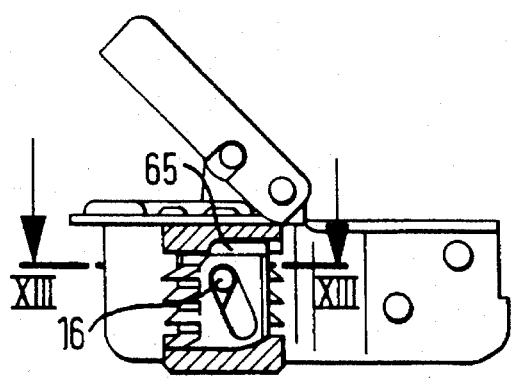
FIG. 11 is a side elevation of a hinge anchoring pot with another embodiment of the attachment elements of the invention in the unlocked state and partially in section.
Figure 12:
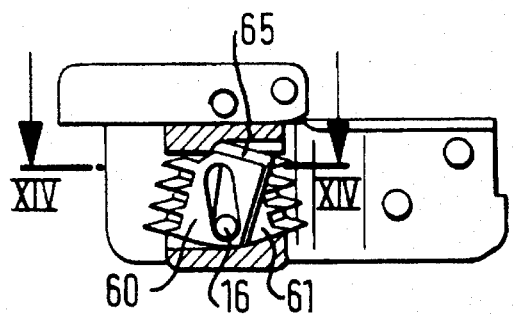
FIG. 12 shows the hinge anchoring pot of FIG. 11 in the locked state of its attachment elements.
Figure 13:
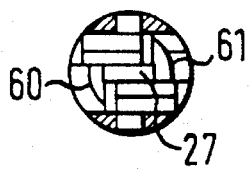
FIG. 13 shows a section taken through the attachment element on the line XIII—XIII of FIG. 11.
Figure 14:
FIG. 14 shows a section taken through the attachment element on the line XIV—XIV of FIG. 12.
Figure 15:
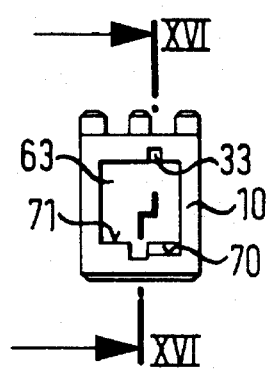
FIG. 15 is a side elevation of the expanding wall plug-like, cylindrical section of the attachment element in accordance with FIGS. 11 and 12.
Figure 16:
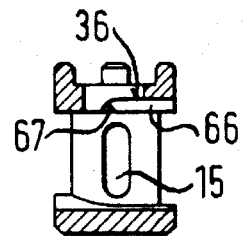
FIG. 16 shows a section taken through the cylindrical section on the line XVI—XVI of FIG. 15.
Figure 17:
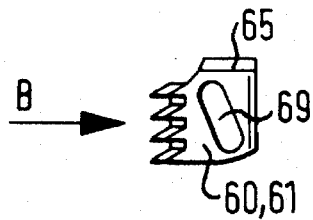
FIG. 17 shows a side elevation of an expanding body of the attachment element in accordance with FIGS. 11 and 12.
Figure 18:
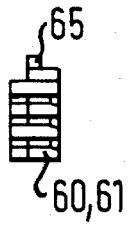
FIG. 18 is a view of the expanding body looking in the direction of the arrow B in FIG. 17.

The attachment elements attached to the widened out side parts of the flange-like edge 12 of the hinge anchoring pot 2, will be best seen in FIG. 10. The attachment elements comprise the expanding wall plug-like cylindrical sections 10. Such cylindrical sections 10 are respectively provided with a radial aperture 13 delimited by side walls, a bottom wall and a top wall of the cylindrical section 10. In the side walls there are axially extending slots 14 and 15, in which a bolt 16 runs axially.

The expanding bodies 17 and 18 are slidingly mounted alongside each other in the aperture 13 for radial movement. The expanding bodies 17 and 18 comprise rectangular guide members 19 and 20, which at their front ends, which are able to be extended from the aperture 13 and inserted (or retracted) into it, bear segments 21 and 22 having the form of circular arcs. These segments have their side edges projecting past the rectangular guide members. The guide members 19 and 20 are provided with intersecting slots 24 and 25. In the condition retracted into the aperture 13 the expanding bodies 17 and 18 have their outer sides in engagement with the side wall surfaces of the aperture and have the link 27 positioned between them. In their condition retracted into the aperture 13 the expanding bodies 17 and 18 are fixed in place by the bolt 16 running through the slots 14 and 15 of the cylindrical section 10, the intersecting slots 24 and 25 of the expanding bodies 17 and 18 and the hole 28 in the link 27 extending between the expanding bodies.

The terminal surfaces 29, 30 and 31, 32 of the guide members 19 and 20 of the expanding bodies 17 and 18 run along tracks in the bottom wall surface and the top wall surface of the cylindrical section 10, of which in FIG. 10 only the lower guide tracks 33 and 34 will be seen. The guide tracks 33 and 34 rise in the extension direction of the expanding bodies 17 and 18. The guide tracks in the top wall surface of the cylindrical section 10 extend in parallelism to the guide tracks 33 and 34 so that the expanding bodies are held and guided between these guide tracks. The height of the guide members 19 and 20 is so related to the distance or pitch of the guide tracks of the cylindrical section that the members may be slid along without danger of running skew or tilting.

The top wall surface of the cylindrical section 10 is provided with a slot 36, through which the link 27 extends. Furthermore the cylindrical section is provided at its top side with pins 37, which extend through holes 38 in the flange-like edge 12 and are rivetted in same to hold the cylindrical section 10 on the flange-like edges 12. The flange-like edges 12 as well are provided with openings 40 for the link 27.

At the inner edge portion of its flange-like edge the hinge anchoring pot 2 bears two lugs 42 having holes 41 and serving for pivotally supporting the plate 11 constituting the actuating lever. For the purpose of providing an articulating connection between the plate 11 and the hinge anchoring pot 2 the inner edge part of the plate is provided with bearing holes 44, which are interrupted by slots 45. The bearing lugs 41 of the hinge anchoring pot 2 fit into such slots 45, in which respect to provide an articulating connection between the plate 11 and the hinge anchoring pot the pivot pins 46 are made to extend through the aligned holes 44 and 41. The plate 11 is provided in the manner indicated with a surrounding edge 48 so that in its state folded onto the hinge anchoring pot 2 it completely covers over the flange-like edge 12 of the hinge anchoring pot.

At some distance from the bolts 46, constituting pivot pins, forked bearing lugs 50 are provided on the bottom side of the plate 11, the limbs of such lugs 50 being provided with aligned holes 51. Between the limbs of the bearing lugs 50 the upper ends of the links 27 are fitted, in which respect to provide an articulated connection of the links with the plate the pivot pins 53 and 54 are inserted through the aligned holes 51 in the bearing lugs 52 of the links.

Figure 2:
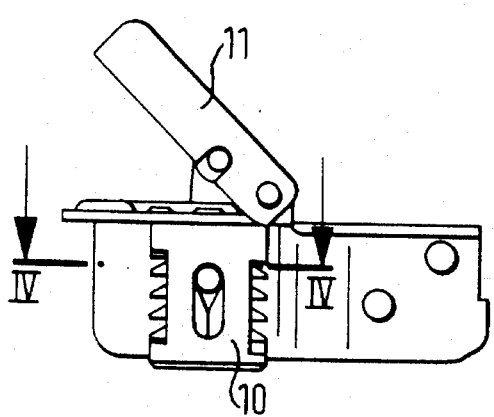
FIG. 2 shows the hinge anchoring pot detached from the hinge of FIG. 1 in the position for assembly.
Figure 3:
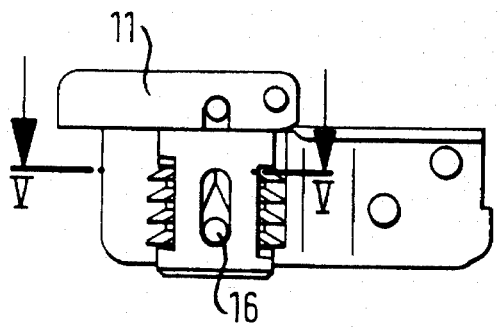
FIG. 3 shows a view corresponding to FIG. 2, of the hinge anchoring pot in its locked, fitted state.
Figure 4:
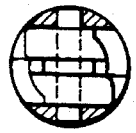
FIG. 4 shows a section taken through the expanding wall plug-like cylindrical section on the line IV—IV of FIG. 2.
Figure 5:
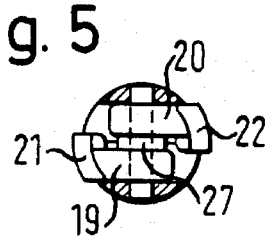
FIG. 5 shows a section taken through the expanding wall plug-like cylindrical section on the line V—V of FIG. 3.

If the plate 11 forming a covering lid is tilted then owing to the drive arrangement described, by means of each link 27 each bolt 16 will be moved upward and downward in the slots 14 and 15 of the cylindrical section 10 so that due to such tilting motion the expanding bodies 17 and 18 will be drawn into the aperture 13 and on pressing down the plate 11 will be caused to extend from the aperture 13 because when the bolt 16 is moved in the slots 24 and 25 it causes the expanding bodies to move radially. The drawn-in position of the expanding bodies 17 and 18 is indicated in FIG. 2, wherein the plate 11 is pivoted away from the hinge anchoring pot 2. In the spread position illustrated in FIG. 3 the plate 11 is pressed down onto the hinge anchoring pot so that the expanding bodies will be in their radially extended, locking setting.

The expanding bodies 17 and 18 are, as shown in FIG. 10, identical in construction.

Figure 6:
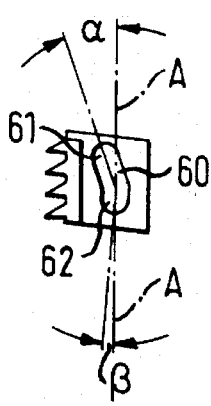
FIG. 6 shows a side elevation of an expanding body.
Figure 8:
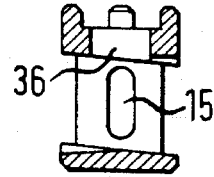
FIG. 8 is a section taken through the cylindrical section on the line VIII—VIII of FIG. 7.
Figure 7:
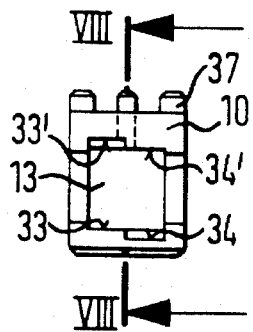
FIG. 7 shows a side elevation of the expanding wall plug-like cylindrical section.

In the illustrated working embodiment of the invention of FIG. 6 the guide members of the expanding bodies are provided with angled slot 60. Here the slot 60 possesses an upper longer limb 61, which is set at an angle a to the longitudinal center plane A of the cylindrical section 10, and a lower shorter section 62, which is set at an angle β to the longitudinal center plane A in the opposite direction to the section 61.

Moreover it will be seen from FIG. 6 that the upper and lower guide surfaces 29 and 31 are made oblique in the same manner as the guide tracks 33, 33' and 34, 34' in the bottom and top wall surface of the aperture 13 in the cylindrical section.

Figure 9:
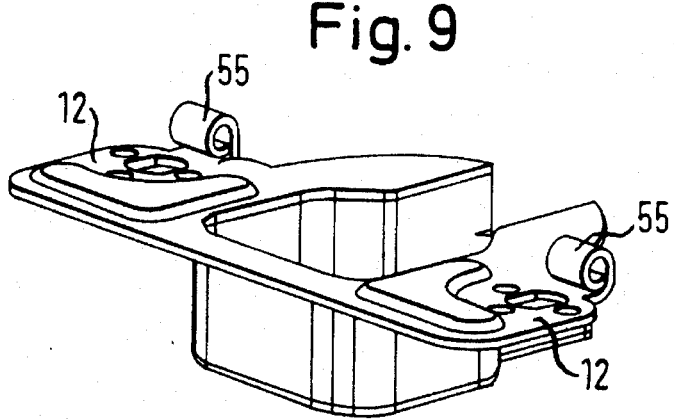
FIG. 9 is a perspective view of one embodiment of the hinge anchoring pot without the actuating lever and cylindrical, expanding wall plug-like sections.

The hinge anchoring pot depicted in FIG. 9 differs from that of FIG. 10 essentially only in that instead of the lugs 42 provided with the holes 41 scrolled up lugs 55 are provided forming bearing eyes.

A further embodiment of the invention will now be described with reference to FIGS. 11 through 18. This embodiment differs from the one explained with reference to FIGS. 1 through 10 essentially only in that the expanding bodies 60 and 61 are pivotally mounted in the aperture 63 of the cylindrical section 10 instead of being able to slide radially. The expanding bodies 60 and 61, which are again identical in design, possess rib- or spring-like extensions 65 on the top sides of their guide members, such extensions fitting into corresponding grooves 66 in the top wall of the apertures 63, such apertures being continued adjacent to the slot 36 as recesses. At their inner terminal portions the recesses are provided with abutments 67, which are engaged by the outer ends of the spring-like extensions 65 in the manner indicated in FIGS. 11 and 12.

The guide members of the expanding bodies 60 and 61 are again provided with intersecting, obliquely running slots 69. The bolt 16 extending through the slots 14 and 15 of the cylindrical section, the slots 69 in the expanding bodies 60 and 61 and the bearing hole 28 in the link 27 serves to hold the expanding bodies 60 and 61 in engagement with the abutments 67 at the outer edges of the spring-like extensions 65 so that by pressing down the bolt 16 out of its position indicated in FIG. 11 the expanding bodies 60 and 61 can be rocked out of their positions depicted in FIG. 11, wherein they are in the envelope contour of the cylindrical section, into the spread or expanded state illustrated in FIG. 12.

In order to render possible unobstructed outward pivoting of the expanding bodies 60 and 61 the support surfaces 70 and 71 on the bottom of the aperture 63 are rounded off in accordance with the pivot radius of the expanding bodies 60 and 61.

FIGS. 19 through 30 show one design of a connecting fitting, which serves, for instance, for joining together two board-like or panel-like parts set together at a butt joint and/or at an angle. The connecting fitting comprises a pot-shaped housing 80 with a generally rectangular flange 81 extending past its anchoring part in the form of a cylindrical disk. The insert part, in the form of a cylindrical disk, of the pot-shaped housing is set in a shallow, routed or milled out blind hole in a furniture part 82, the shallow blind hole intersecting the narrow front side of the board-like furniture part 82 and the flange-like edge 81 resting on the edge of the shallow hole. The pot-shaped housing is integrally provided with, i.e. made of the same piece of material as, a radial extension 83 in the form of a cylindrical pin extending into a blind hole 84 in the furniture panel 85 to be joined at an angle to the furniture panel 82. The extension 83 in the form of a cylindrical pin is the same as the extension 10 in the form of a cylindrical pin of the embodiments 1 through 18 so that it and the expanding bodies spread out by the bolt 16 and able to be retracted are not described separately again. The extension 83 in the form of a cylindrical pin of the embodiment of FIGS. 19 through 23 differs from that of the preceding embodiments essentially only to the extent that it is divided in its axial center plane and its halves 83' and 83" are integrally joined with the housing halves 80' and 80" of the pot-shaped housing 80.

The cylindrical insert part of the pot-shaped housing is made flat at its front side, at which it is integrally connected with the cylindrical extension 83. In the plane of such flat there is also the flattened front edge of the flange 81, which in the manner indicated in FIGS. 19 through 23, is aligned with the front narrow side of the furniture part 82.

The pot-shaped housing 80 is provided with an essentially rectangular recess 86, whose side wall surfaces are provided with parallel grooves 87 and blind holes 88. The mutually parallel side edges of the actuating part 89, which is connected integrally with the slide 90, run in the grooves 87. The slide 90 is provided with a front hole 91, wherein the bolt 16 driving the expanding bodies 17 and 18 is held.

The actuating part 89 of the slide 90 is provided in its center with a rectangular opening 92, in which, in the manner indicated in FIGS. 19 through 23, the lower shorter lever arm 94 of the actuating lever 95 fits. The actuating lever 95 is integrally designed and possesses molded lateral pivot pins 96, with which it is pivotally mounted in the blind holes 88 in the housing halves 80' and 80". The lower lever shorter arm 94 generally possesses the form of an equilateral triangle with rounded apices 98, the angles of the equilateral triangle and the radius of curvature of the rounded apices being so selected that front and rear sides of the lever 94 are substantially always in engagement with the front and rear edges 99 and 100 of the aperture 92.

On its top side adjacent to the recess 86 the pot-shaped housing is provided with a shallow recess 101, wherein, in the locked state of the connection fitting, the longer lever arm 102 of the actuating lever 95 rests so that in the locked condition the actuating lever 95 is substantially in the same plane as the flange 81.

Figure 25:
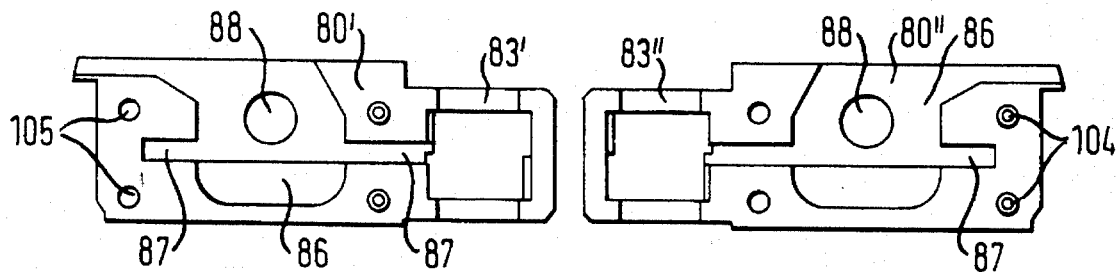
FIG. 25 is a side elevation of the parting planes of the housing halves of the pot-like housing.
Figure 26:
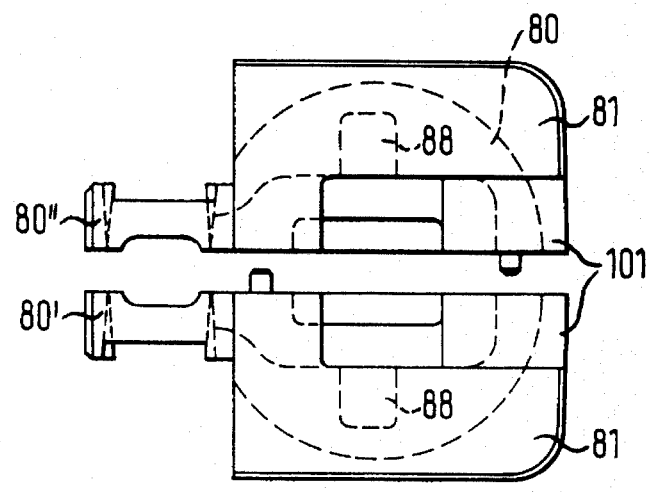
FIG. 26 is a plan view of the housing halves in accordance with FIG. 25 directly prior to fitting same together.
Figure 27:
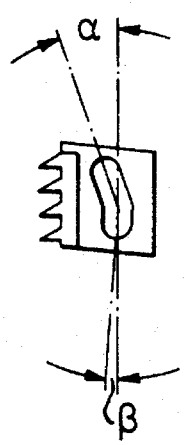
FIG. 27 is a side elevation of the expanding body in accordance with FIG. 6.
Figure 28:
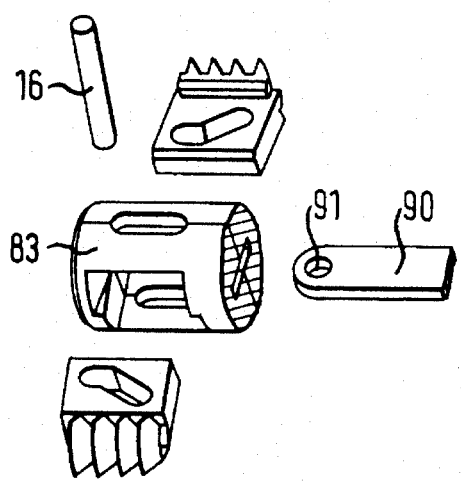
FIG. 28 is a representation, corresponding to FIG. 10, of the pin-like, cylindrical section with the expanding bodies, introduced into the same, in an exploded view.
Figure 29:
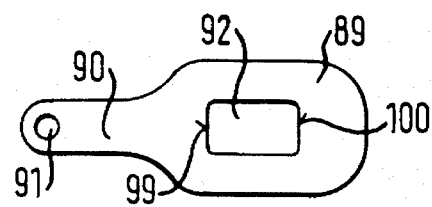
FIG. 29 is a plan view of the slide with a actuating part.
Figure 30:
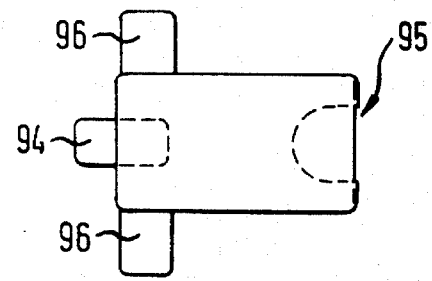
FIG. 30 is a plan view of the actuating lever.

In the manner illustrated in FIG. 25 the housing halves 80' and 80" are provided in their parting plane with connecting pins 104 and complementary holes 105 so that after insertion of the actuating lever, of the slide 90 with the actuating part, of the bolt 16 and of the expanding bodies the housing halves can be fitted together.

Figure 19:
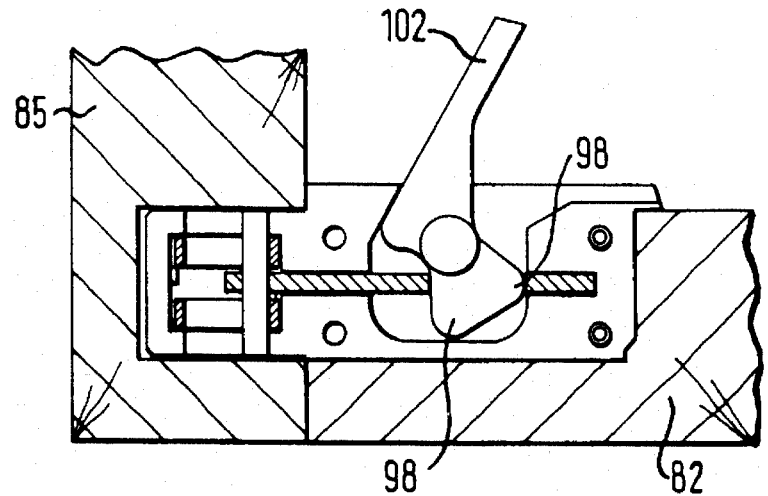
FIG. 19 shows an axial section taken through a pot-like furniture fitting for the connection of two furniture parts approaching each other at a butt joint and/or at an angle.
Figure 20:
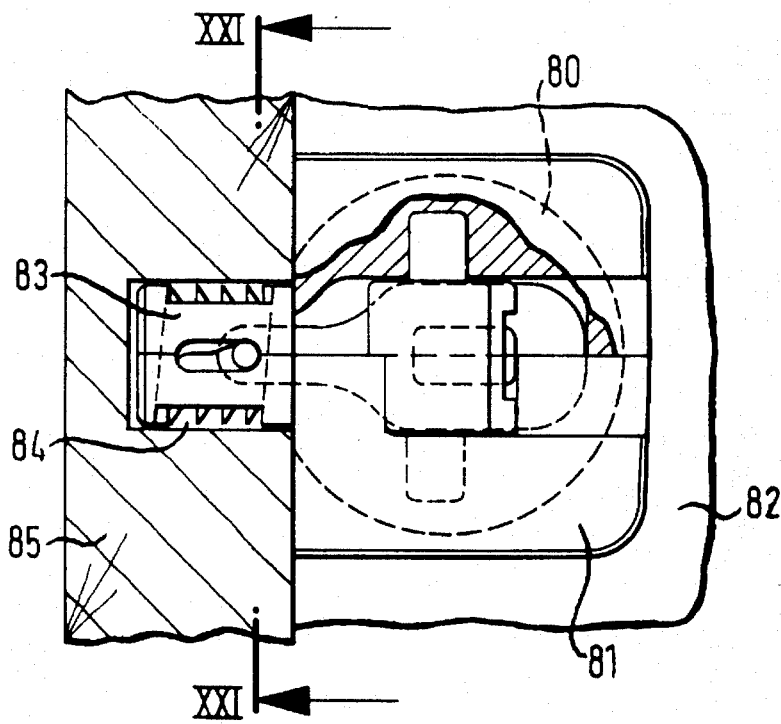
FIG. 20 is a plan view of the fitting part of FIG. 19, partially in section.
Figure 21:
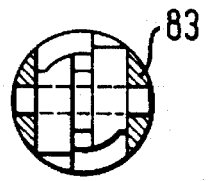
FIG. 21 is a section taken through the pin-like, cylindrical extension of the fitting on the line XXI—XXI of FIG. 20. is a section, corresponding to FIG. 19, FIG. 22 showing the locked state of the fitting part.
Figure 22:
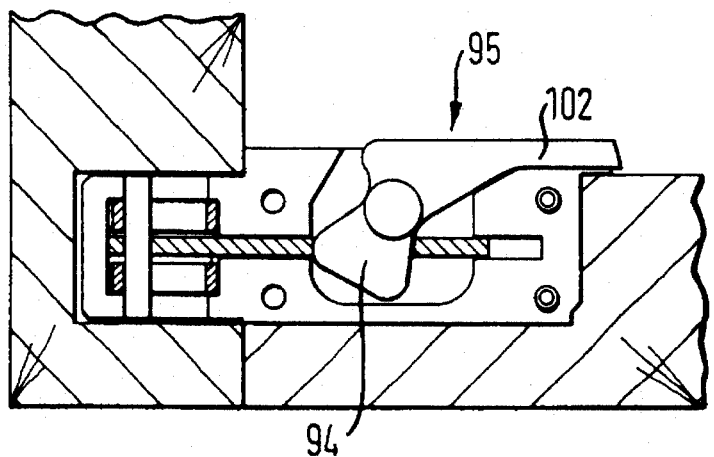
Figure 23:
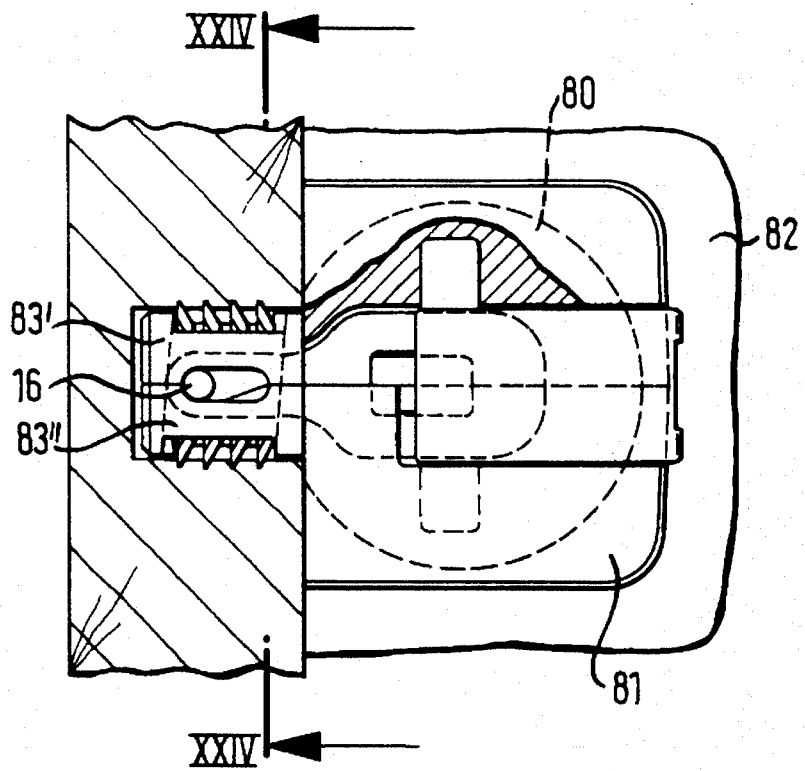
FIG. 23 is a plan view of the fitting part in accordance with FIG. 22.
Figure 24:
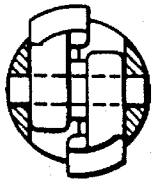
FIG. 24 is a section, corresponding to FIG. 21, taken through the cylindrical extension on the line XXIV—XXIV of FIG. 23.

FIGS. 19 and 20 serve to show the connecting fitting in its unlocked state, in which the parts to be locked are pre-assembled by plugging same together. Locking is then performed by flipping over the longer lever arm 102 of the actuating lever 95 out of the unlocked setting illustrated in FIGS. 19 and 20 into the locked position illustrated in FIGS. 22 and 23.

The last embodiment of the connecting fitting in accordance with the invention will be now described with reference to FIGS. 31 through 40. It differs from the embodiment in accordance with FIGS. 31 through 40 to the extent that the halves of the pin-shaped cylindrical extension 83 are made integrally united with the two housing halves of an insert housing 110. This insert housing comprises the two housing halves 110' and 110" (which are adapted to be fitted together), the insert housing 110 also being provided with a rectangular recess 86, in whose side wall the guide groove 87 and the holes 88 for bearing the pivot pins 96 of the actuating lever 95 are arranged. The insert housing provided with mutually parallel outer sides runs in suitable guides in the pot-shaped housing 112 for radial sliding motion. The pot-shaped housing 112 for its part comprises two housing halves 112' and 112" divided in the axial center plane and which can be fitted together in the fashion indicated in FIG. 38.

In the side walls 113 of the pot-shaped housing 112 slots 114 extending in the axial direction are arranged which are in the form of blind holes and in which pivot pins 115 are pivotally borne, such pins constituting eccentric prolongations of the pivot pins 96. The holes 88 in the side walls of the insert housing 110 are in the form of through holes the so that the eccentric pivot pins 115 fit into the blind holes 114 in the side of the housing halves 112' and 112".

Figure 31:
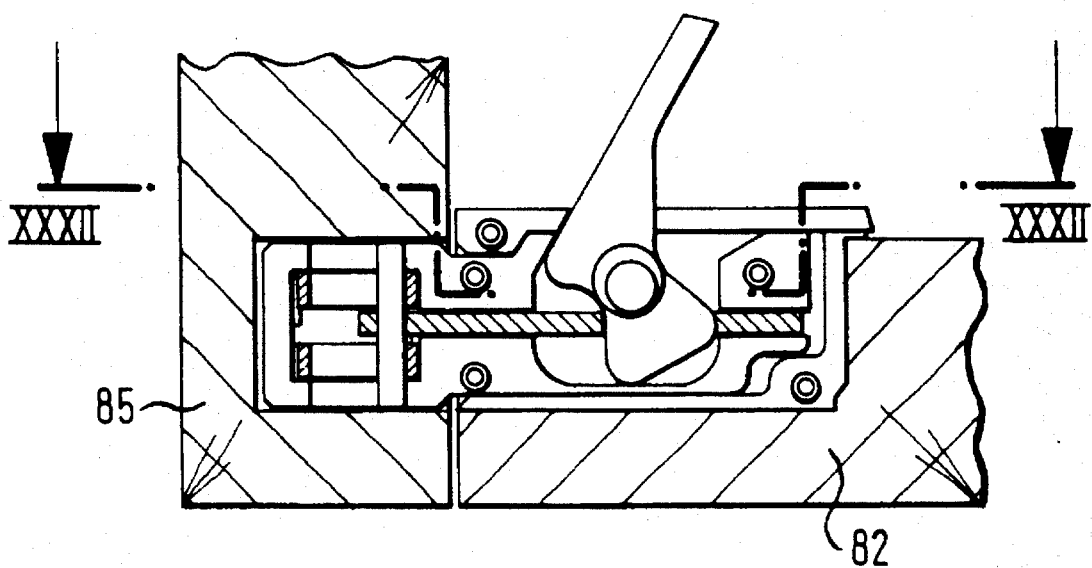
FIG. 31 is a section corresponding to FIG. 19 taken through a fitting comprising an insert housing, running radially in the pot-like housing.
Figure 32:
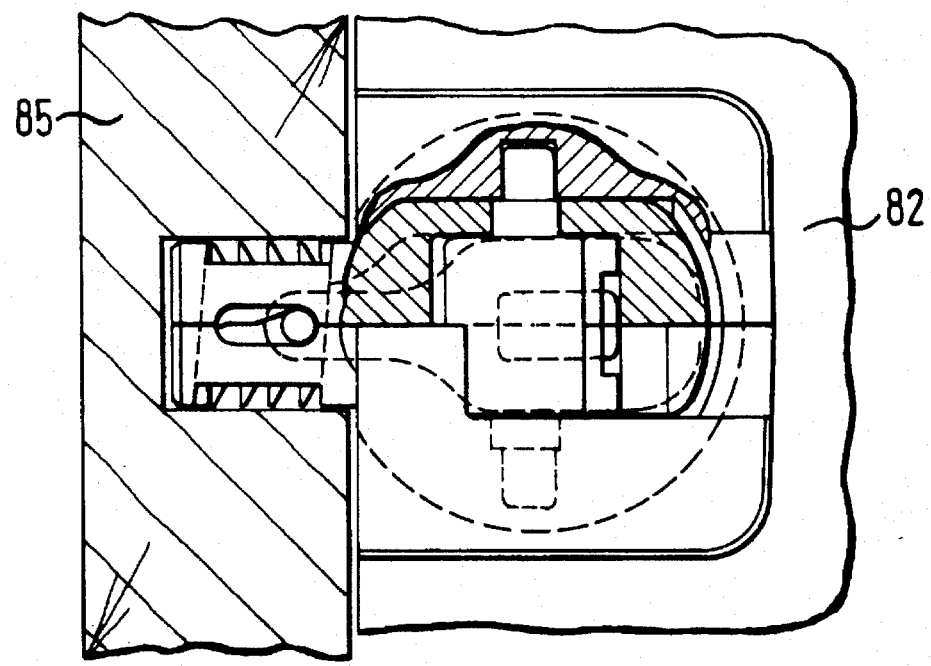
FIG. 32 is a plan view of the fitting in accordance with FIG. 31, partly in section, taken on the line XXXII—XXXII.
Figure 33:
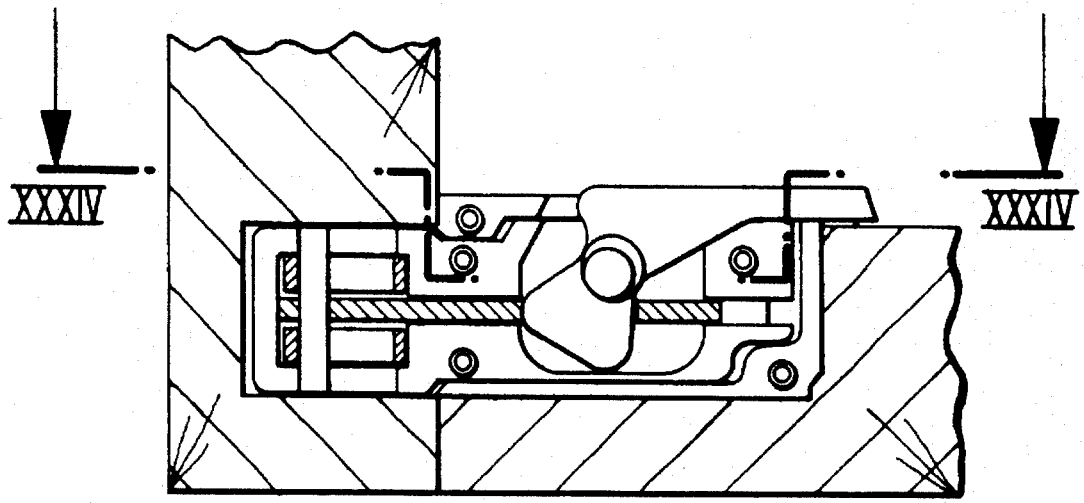
FIG. 33 is a view corresponding to FIG. 31 of the fitting part in the locked state thereof.
Figure 34:
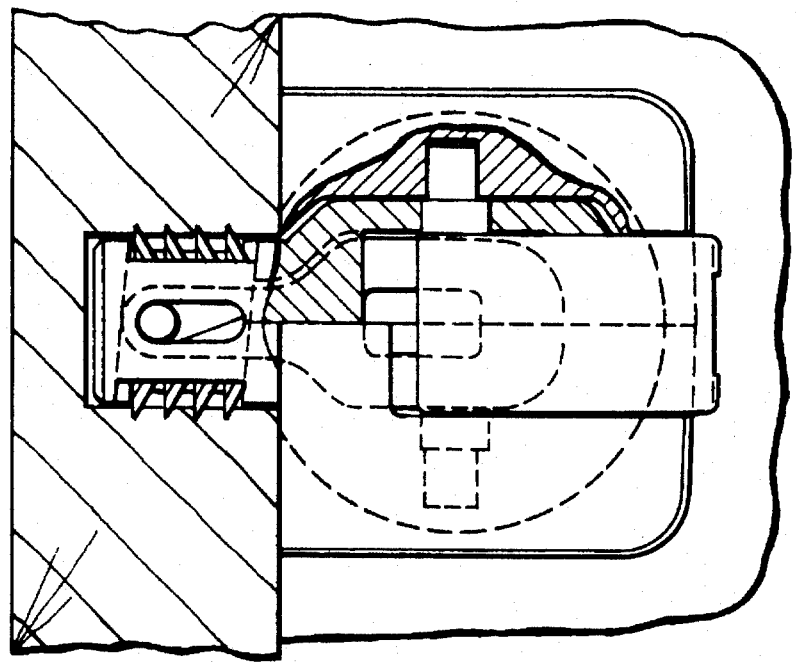
FIG. 34 is a plan view of the fitting in accordance with FIG. 33, partly in section taken on the line XXXIV—XXXIV.
Figure 35:
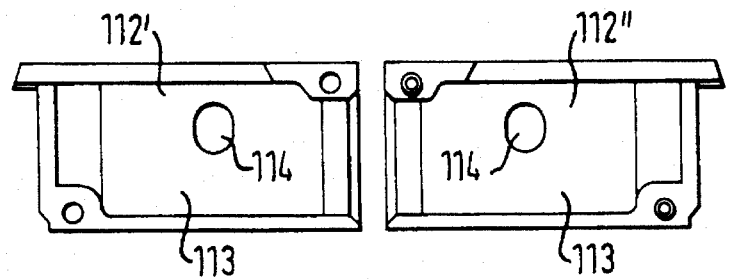
FIG. 35 is a view on the parting planes of the two housing parts of the hinge anchoring pot of the fitting part in accordance with FIGS. 31 through 34.
Figure 36:
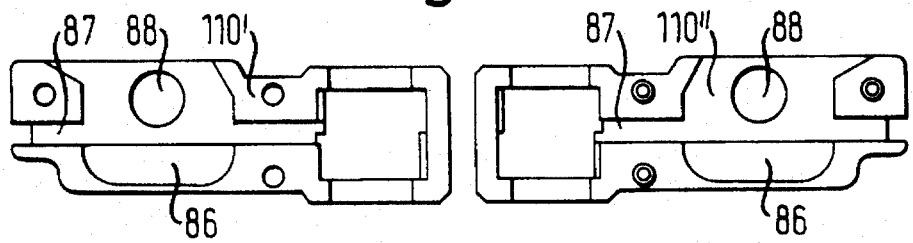
FIG. 36 is a view on the parting planes of the two housing parts of the insert housing which runs radially in the housing.
Figure 37:
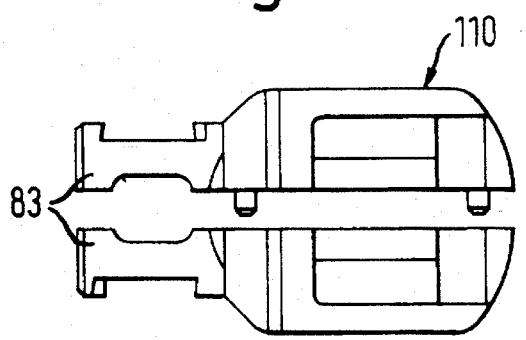
FIG. 37 is a plan view of the housing halves of the insert housing in accordance with FIG. 36 directly prior to fitting together thereof.
Figure 38:
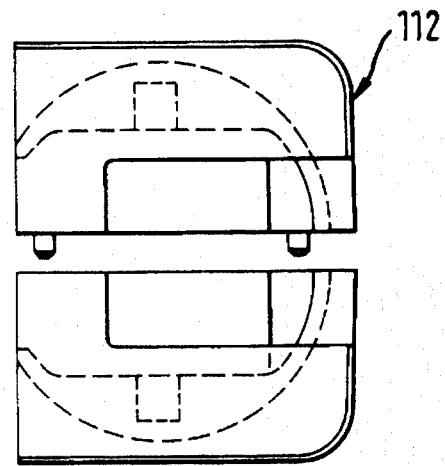
FIG. 38 is a plan view of the housing system of the housing in accordance with FIG. 35 directly prior to the fitting together thereof.
Figure 39:
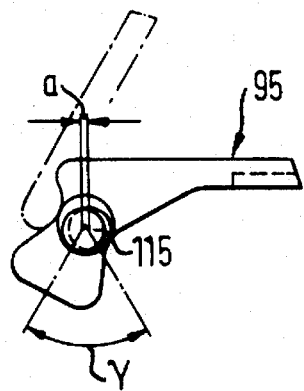
FIG. 39 is a side elevation of the actuating lever in the embodiment of the fitting part in accordance with FIGS. 31 through 38.
Figure 40:
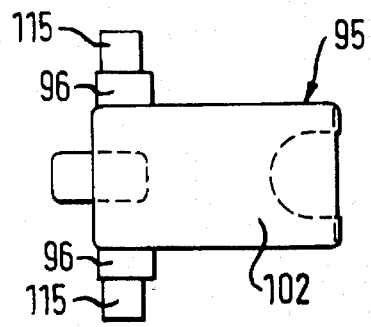
FIG. 40 is a plan view of the actuating lever in accordance with FIG. 39.

On pivoting of the longer lever arm 102 of the actuating lever 95 out of the unlocked setting illustrated in FIGS. 31 and 32 into the locked setting depicted in FIGS. 33 and 34 through the angle y, due to the eccentricity of the pivot pins 115, the insert housing is drawn in for the distance a in a radial direction into the housing 112 with the result that the gap between the furniture parts 82 and 85 is taken up in the fashion indicated in FIGS. 31 through 34.

I claim:

1. An attachment element for fitting parts, comprising a pin shaped and substantially cylindrical section having a cylindrical axis, axial slots, a cylindrical enveloping contour and a radial aperture, two expanding bodies having intersecting slots and respective ends within said cylindrical section for expansion and retraction relative to the cylindrical section in opposite directions past the cylindrical enveloping contour, a link having two ends and axial holes formed therebetween, an actuating lever acting on one of the link ends for toggling movement, a bolt in the axial slots, the bolt extending through the intersecting slots in the expanding bodies in order to toggle the expanding bodies outward and inward by pivotal movement of the link.

2. The attachment element of claim 1 further comprising a plate shaped part, the substantially cylindrical section being connected with the plate shaped part, a lever having two ends and a pivot bearing pivotally connected with the plate shaped part, the link being pivotally connected with one end of the lever and spaced from the pivot bearing, the other end of said link being attached to the bolt in the axial slots in the cylindrical section.

3. The attachment fitting of claim 1 wherein the expanding bodies are rectangular guide members at their expanding and retracting ends thereof and have arcuately curved, toothed segments.

4. The attachment element of claim 1 further comprising toothed segments having saw-tooth-shaped ribs.

5. The attachment element of claim 4 wherein said ribs comprise terminal surfaces and opposite terminal surfaces spaced by said ribs, said terminal surfaces facing the plate shaped part more obliquely than the respective opposite terminal surfaces.

6. The attachment element recited in claim 3 wherein the guide members further comprise inner surfaces enclosing the link between them and guide member outer surfaces bearing on the side walls of the radial aperture.

7. The attachment element according to claim 6 wherein the guide members further comprise terminal guide surfaces interposed between the inner and outer guide surfaces, said terminal guide surfaces delimit the radial aperture in the cylindrical section, said terminal guide surfaces being inclined for each expanding body relative to the outward expansion direction.

8. The attachment element according to claim 7 further comprising the aperture in the cylindrical section having surfaces that are oblique to match the terminal surfaces of the guide members.

9. The attachment element according to claim 3 in that the guide members further comprise intersecting sections of the intersecting slots.

10. The attachment element according to claim 3 wherein the intersection slots of the guide members are angular and have a longer limb at an angle relative to the cylindrical axis and a shorter limb extending at a smaller angle relative to the cylindrical axis in the opposite direction to the longer limb.

11. The attachment according to claim 7 wherein at least some of the terminal guide surfaces further comprise abutments, and complementary abutments formed in the radial apertures for engagement with said terminal guide surface abutments to enable the bolt in the intersecting slots of the expanding bodies and the axial slots that extend and retract relative to the enveloping contour of the cylindrical section are pivoted outward relative to the cylindrical section.

12. The attachment element according to claim 1 wherein the attachment element has a flange having an edge, further comprising a hinge anchoring pot.

13. The attachment element according to claim 12 wherein, the lever comprises a plate with an inwardly pivoted locking position that covers the flange edge of the hinge anchoring pot.

14. The attachment element according to claim 1 wherein the pin shaped cylindrical section further comprises means for connection with a furniture fitting, said means having a diameter that matches the furniture fitting.

15. The attachment element as claimed in claim 14, in which the cylindrical section further comprises a pot shaped housing having an aperture formed therein and which the cylindrical section is an extension thereof.

16. The attachment element as claimed in claim 14 in which the link further comprises an integral actuating part, on which the actuating lever acts.

17. The attachment element as claimed in claim 16 in which the actuating part of the link is activated in a radially sliding fashion, the pot shaped housing having lateral grooves in the side walls of the housing and an aperture formed in the housing sidewall, whereby the link connected with the sidewall grooves extend through the aperture in the circumferential wall of the housing into the pin shaped cylindrical extension.

18. The attachment element as claimed in claim 14 wherein the actuating lever further comprises a two-armed lever, said arms being of unequal length, the recess side walls having holes for rotatably receiving the pivot bearing therein, the shorter arm of the lever fitting into an aperture in the actuating part, the longer arm of the lever resting on the housing.

19. The attachment element as claimed in claim 18 wherein the longer arm of the lever is selectively pivoted to a released setting of the attachment element and into a locking setting, in which the long lever arm is generally in the same plane as the cover plate of the housing.

20. The attachment element as claimed in claim 18 wherein the actuating part has a rectangular aperture formed therein, the short lever arm generally forming an equilateral triangle with rounded apices, the angle included therebetween being adjacent to the pivot bearing of the actuating lever.

21. The attachment element as claimed in claim 20 further comprising the angles and the radius of curvature of the apices of the short lever arm being matched to enable the generally triangular shorter lever arm to toggle selectively against the front and rear edges of the rectangular aperture in the actuating part.

22. The attachment element as claimed in claim 14 further comprising the housing divided in its axial center plane through the cylindrical section, whereby two parts are formed symmetrically in relation to one another.

23. The attachment element as claimed in claim 14 in which the pin shaped cylindrical section further comprises an insert housing extension, wherein the link and the actuating lever are pivotally mounted, the insert housing being secured in a longitudinally sliding manner in the pot shaped housing, the pivot pins of the actuating lever are pivotally arranged in the holes in the side walls of the insert housing and have eccentric extension pins for the actuating lever which are pivotally mounted in holes in the walls of the recess in the housing.

24. The attachment element according to claim 1 wherein the attachment element has a flange having an edge further comprising a hinge arm attachment plate.

25. The attachment element according to claim 1 wherein the link further comprises a slide.

* * * * *